(12) United States Patent
Cunningham et al.

(10) Patent No.: US 6,480,922 B1
(45) Date of Patent: Nov. 12, 2002

(54) COMPUTER SOFTWARE CONTROL AND COMMUNICATION SYSTEM AND METHOD

(75) Inventors: John Spencer Cunningham; Jeff Brandon Ogden, both of Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/373,920

(22) Filed: Aug. 12, 1999

(51) Int. Cl.[7] .......................... G06F 13/00; G06F 9/06
(52) U.S. Cl. ........................ 710/305; 710/100; 700/86
(58) Field of Search .......................... 710/2, 5, 19, 74, 710/305, 313, 315, 700; 709/253; 714/1, 4; 700/86; 711/154, 156; 370/359, 908; 379/90.1, 908

(56) References Cited

U.S. PATENT DOCUMENTS

| | | | |
|---|---|---|---|
| 4,167,041 A | * | 9/1979 | Curlander et al. |
| 5,270,943 A | * | 12/1993 | Warn |
| 5,457,782 A | * | 10/1995 | Daly et al. |
| 5,504,669 A | * | 4/1996 | Wakabayashi et al. |
| 5,615,085 A | * | 3/1997 | Wakabayashi et al. |
| 5,764,505 A | * | 6/1998 | Mixon et al. |
| 5,995,513 A | | 11/1999 | Harrand et al. ............. 343/439 |

FOREIGN PATENT DOCUMENTS

| | | | |
|---|---|---|---|
| EP | 0 206657 A | 12/1986 | ............ G06F/13/12 |
| EP | 0 701 214 A | 3/1996 | ............ G06F/13/12 |
| EP | 0 786 841 A | 7/1997 | ............ H01S/3/104 |

OTHER PUBLICATIONS

Shanley & Anderson; "PCI System Architecture," 1995, Addison–Wesley, Reading, Massachusetts, USA, XP002153909, p. 331–243.

* cited by examiner

*Primary Examiner*—Gopal C. Ray
(74) *Attorney, Agent, or Firm*—Loria B. Yeadon; Michele M. Burris

(57) ABSTRACT

The present invention is a computer system and method for facilitating communication between a primary software program on a computer and at least one secondary software program loaded on a computer circuit card via a communications bus. Both the primary software program and the secondary software program have predefined register storage space for storing data, and in particular, for storing data relating to system and fault status, among other things. The primary software program communicates, direct and controls the data between itself and among the various secondary software programs by interaction between the predefined registers. The primary software program communicates, direct and controls the data through the use of common headers present in the registers.

24 Claims, 4 Drawing Sheets

COMPUTER SOFTWARE CONTROL AND COMMUNICATION SYSTEM AND METHOD

FIELD OF THE INVENTION

The present invention relates generally to a computer software control and communication system for computer systems communicating via a communications bus.

BACKGROUND OF THE INVENTION

Communication buses allow for the transfer of data among various processing and data storage mediums. Typical communication buses, such as for example, the Versa Module Eurocard 64 (VME64) bus, allow a plurality of hardware circuitry cards to be attached to a computer controllable backplane in order to allow communication to flow among the various hardware circuitry cards and the computer. These circuitry cards are conventional circuit boards containing electronic means for executing predetermined functions or a predetermined software program, such as for example, setting clock frequency, data transfer, data storage and executing test functions.

Communication buses are frequently employed by embedded systems. An embedded system can take on many forms, but is generally known by those of skill in the art to include a system in which a computer is built into the system, yet the user does not view the system as including the use of a computer. This can occur, for example, in a television set having one or more computer processors, yet the person using the television set does not realize the set includes such computers. An embedded system also includes a special purpose computer and control circuitry built into a device which is programmed for a particular purpose. Such systems include what are known as "embedded processors" or "embedded microcontrollers." Some examples of embedded systems include flight management systems, weapons systems, aircraft control systems, and avionics systems for the aerospace industry; manufacturing automation systems, manufacturing robots, chemical processing plants and refineries for the process control industry; car management systems for the automotive industry; and switches, routers and PBX systems for the communications industry.

When new or revised circuit cards are added to an existing system having a communications bus, often times it is difficult to communicate with the card. Sometimes this communication difficulty is due to misdirected software handshakes, faulty data transfers and in some cases, may be due to mismatched technology. In these cases, the software in the embedded system and perhaps the software in other cards must be reprogrammed to communicate with the new or revised circuit card. This process is time intensive, increases the complexity of the system, is costly and usually results in expending further development resources. Due to this deficiency in the prior art, a need exists for a common computer software control and communication system which allows a primary software means to communicate with new or revised circuit cards as needed. Such a system, as disclosed by the present invention, would reduce the design time and reduce the resources typically used when new or revised circuit cards are introduced into an existing system.

BRIEF SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

The present invention relates to a computer system and method for facilitating bi-directional communication between a primary software means on a computer and at least one secondary software means, loaded on a computer circuit card, via a communications bus. Both the primary software means and the secondary software means both have predefined register storage space for storing data, and in particular, for storing data relating to system and fault status, among other things.

The present invention provides a simple, yet flexible system and method for communication between a primary processing means and secondary processing means which transfer data via a communications bus. The present invention finds applications in systems having hardware boxes (or "cages") that support dynamic reconfiguration of functionality every time the system is rebooted. In this fashion, upon each reboot of the system, the software means for directing can detect and communicate with each card in the system and adjust the functionality of each card accordingly if necessary to thereby provide a synergistic communications system.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

Figure 1:
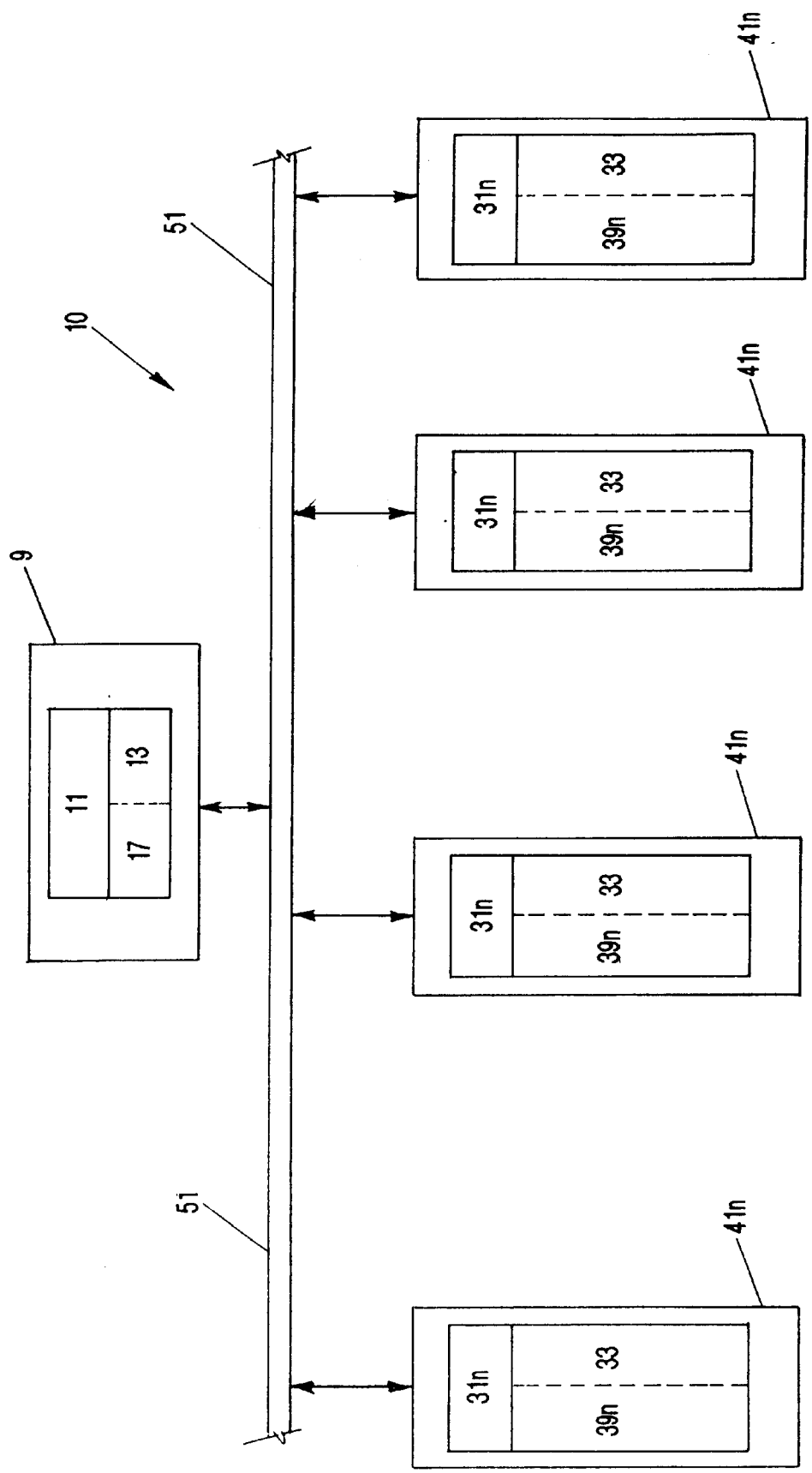
FIG. 1 is a graphical representation of the present invention.

As seen in FIG. 1, the present invention 10 is a computer system and method for allowing communication to take place between primary (or director) software and at least one secondary (or non-director) software program through a communications data bus by a series of unique header registers stored in memory. The primary program is responsible for the control of the overall system including, without limitation, startup, modes of operation, and system fault status reporting and logging. The secondary software program refers to all other modules in the system that are capable of being controlled by the primary. Each such module includes a header for system level control and status reporting.

In particular, the present invention 10 includes at least one first means for processing data 11 in communication with (e.g., electrically, optically, frequency transmissions, etc.) a computer 9 and having a first means for storing data 17 thereon, at least a secondary means for processing data $31_n$ (where n equals the number of means for processing) in communication with a computer circuit card $41_n$ (where n equals the number of cards) having a secondary means for storing data $39_n$ (where n equals the number of secondary means for storing) and in communication with the computer 9 by an arbitrary asynchronous or synchronous communications bus 51, software means for directing 13 stored on and executed upon the first means for processing data 11 and software means for communicating data 33 stored on and executed upon the secondary means for processing data $31_n$.

Figure 2:
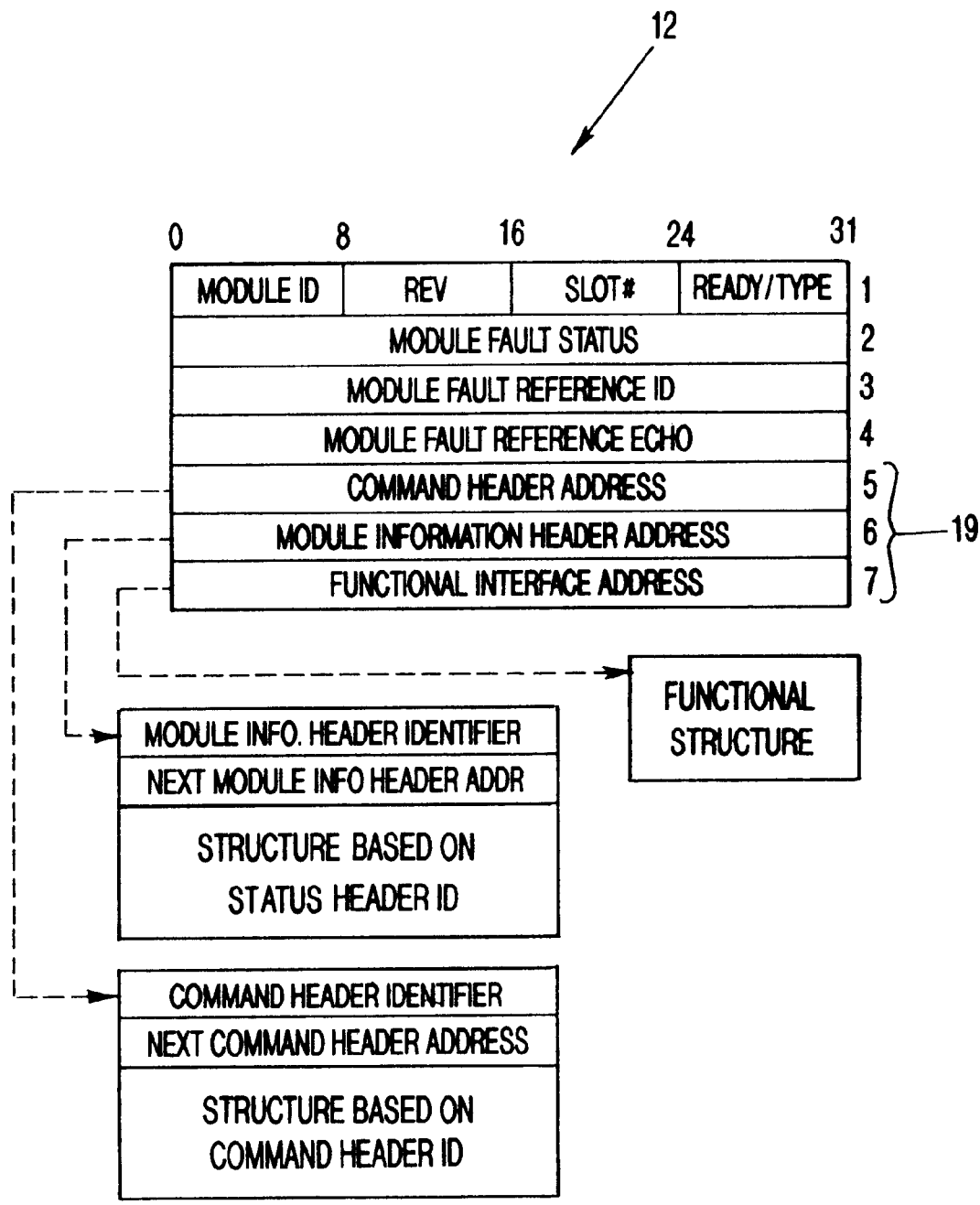
FIG. 2 is a graphical representation of the header register of the present invention.

As seen in FIG. 2, the software means for directing 13 further includes a header register 12 which is stored on the first means for processing 11 and is optionally at least a thirty two bit by four word data register, and is preferably a thirty two bit by seven word data register. In some instances, the header register is a required component where control of the non-director modules by the primary program (director) is desired as will become apparent to those skilled in the art. The first four words of the data register of header register 12 are used to store and transmit data relating to the status information of the first means for processing data 11 (including, for example, identification data, software revision data, physical or logical slot data, operational data, functional interface data, etc.) and for storage and transmission of data relating to any faults (or, errors) detected by the first means for processing 11. The common header interface can include a header and address pointers for a command linked list interface, status linked list interface, and a functional interface.

In an embodiment of the present invention, the common header is used by the primary software program to provide top level module mode control and to read fault status information from the secondary software program modules. The common header resides, for example, at the VME base address for all secondary software program modules. The common header structures are shown in FIGS. 2 and 3.

If additional functionality is required, the header register 12 requires additional memory storage beyond four thirty two bit words, and preferably includes a thirty two bit by seven word data register. Thus, in the additional three thirty two bit word registers, at least one primary software means for linking 19 is stored. Primary software means for linking 19 is a dynamic variable pointer means (or, linked list) which points to any record, data structure or memory register where data can be stored, whether on the first means for processing 11 or any other processing means (such as, for example, any of the secondary means for processing data $31_n$) in communication with the communications bus 51. In a preferred embodiment of the present invention 10, the linked list 19 will store information relating to extended functionality status, extended functionality information and command or actions requests, but can store other pointer information as well. Means for linking 19 is not required to contain a pointer to another register, but rather, can contain a null value. Upon system start up (or, boot up), the means for directing 13 will initialize the header register 12 and maintain knowledge of its contents. Thus, as those of skill in the art will realize, the use of software pointers allows the software to represent complex programming structures while permitting flexibility in software design, and can, for example, utilize memory efficiently (e.g., as desired, memory storage can be created for the pointer as the software means for directing is executed and can be used to store complex software instructions).

Further, those of skill in the art will now come to realize that the software means for directing is a dynamic software means which can be stored and executed upon any of the processing means connected to the communications bus 51. This is especially useful should the first means for processing data 11 fail or experience undesirable errors (such as, for example, if the first means for processing data 11 is damaged). In this case, the software means for directing 13 can then dynamically transfer itself to any other processing means (such as, for example, any of the secondary means for processing data 11) on communications bus 51 and continue to communicate with all software means for communicating data 33. Thus, the term "first" in the first means for processing data 11 is not a term of limitation to only one processing medium.

Figure 3:
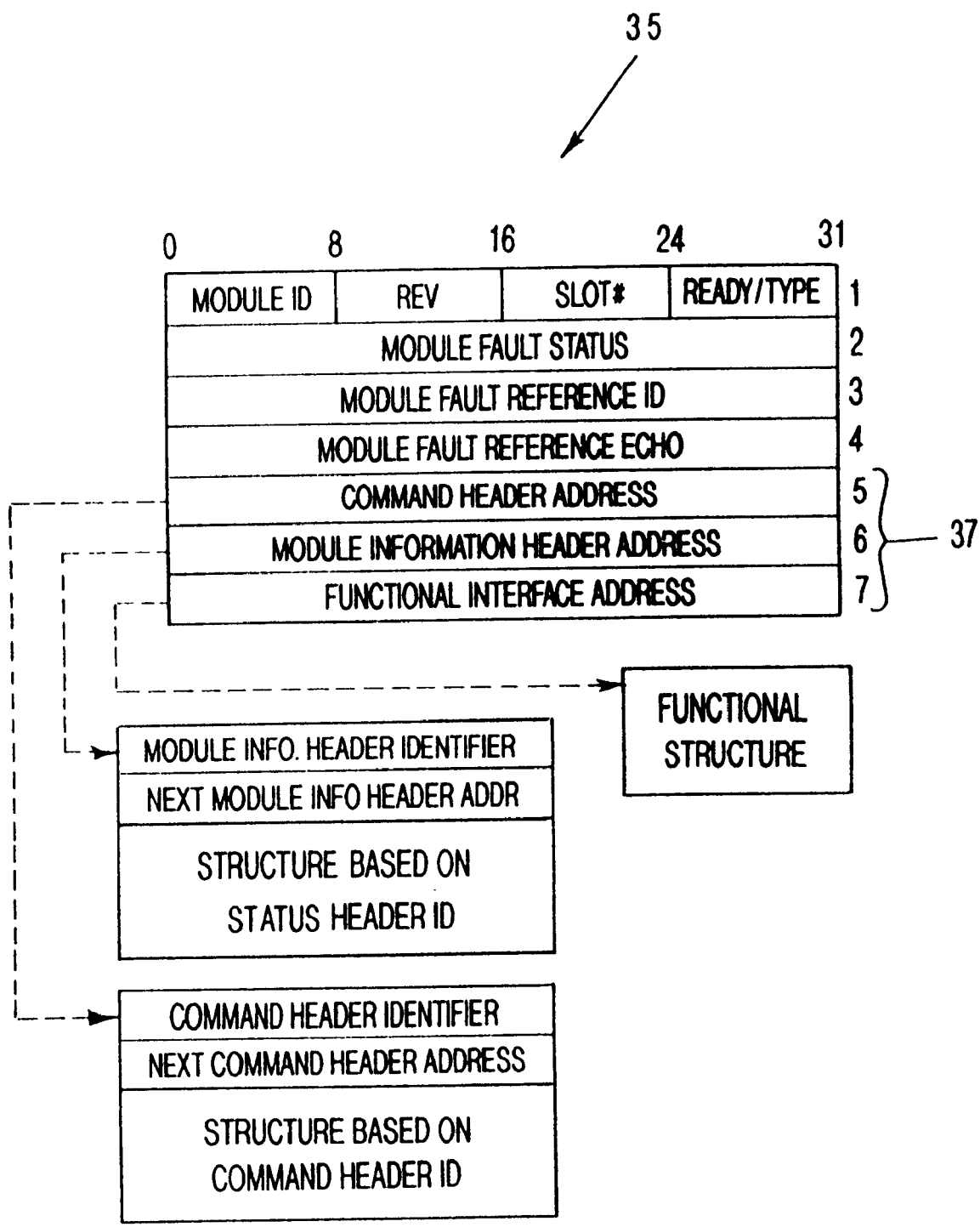
FIG. 3 is a graphical representation of the communications header register of the present invention.

As seen in FIG. 3, the software means for communicating data 33 further includes a communications header register 35 which is stored on the secondary means for processing $31_n$ and is optionally at least a secondary thirty two bit by four word data register, and is preferably a secondary thirty two bit by seven word data register although most registers can be adapted for use with the present invention as will be apparent to those skilled in the art. In some instances, the communications header register 35 is a required component where control of the modules by the primary program is desired as will become apparent to those skilled in the art (i.e., to be controlled by the primary software program). The software means for directing 13 communicates primarily with the communications header register 35 via bus 51. In this fashion, the electronics on each circuit card $41_n$ can communicate with the software means for directing 13 and debugged if necessary without the software means for directing 13 having to understand the functionality of each card $41_n$. As such, as long as each circuit card $41_n$ contains a secondary means for processing data $31_n$ having a secondary means for storing data $39_n$ (in which communications header register 35 is stored) and can communicate with communications bus 51, software means for directing 13 can always obtain any data relating to each card's s functionality, even if each card $41_n$ is functionally different than any other card $41_n$. The first four words of the secondary data register of communications header register 12 are used to store and transmit data relating to the status information of its corresponding secondary means for processing $31_n$ and for storage and transmission of data relating to any faults (or, errors) detected by the corresponding secondary means for processing $31_n$. If additional functionality is required, the communications header register 35 requires additional memory storage beyond four words, and preferably is a secondary thirty two bit by seven word data register. In the additional three word registers, a secondary software means for linking 37 is stored. Each secondary software means for linking 37 is a dynamic variable pointer means which points to any record, data structure or memory register where data can be stored, whether on the first means for processing 11 or any other processing means (such as, for example, any of the secondary means for processing data $31_n$) in communication with the communications bus 51. In a preferred embodiment of the present invention 10, the linked list 37 stores information relating to extended functionality status, extended functionality information and command or actions requests, but can store other pointer information as well. Means for linking 37 is not required to contain a pointer to another register, but rather, can contain a null value. If the means for directing 13 detects a null pointer, the means for directing 13 will recognize that the corresponding circuit card $41_n$ does not contain extended functional capabilities. If a data pointer is detected by the means for directing 13, the means for directing 13 will appropriately follow the location or address in memory of the storage register pointed to. Thus, as will become apparent to those of skill in the art, the use of software pointers (or, linked lists) permits flexibility in software design, and can, for example, utilize memory efficiently (e.g., memory storage can be created for the pointer as the software means for directing is executed).

By way of example and not by limitation, the following types of equipment can be used in the present invention. The first means for processing data 11 (and the secondary means for processing data 31) could be any microprocessor or microcontroller (commercial or proprietary), such as Intel microprocessors (Pentium, Pentium II, Pentium III, Xeon, Merced, etc.), Motorola PowerPC microprocessors (603, 604, G3, G4, etc.), MIPS microprocessors, Sun SPARC microprocessor, IBM RS/6000 processors, etc. First means for storing data 17 (and the secondary means for storing data 39) includes volatile RAM such as EDO, SRAM; non-volatile ram (NVRAM); programmable flash memory; or even disk-based memory. Computer 9 can be a conventional computer or even a circuit card with computing functions or any other component having computing capabilities. Generally, a computer is defined by its components e.g., the processing means and data storage means. Software means for directing 13 and software means for communicating data 33 can be software programs that implements the primary and secondary software programs (director and non-director) functionality for the common header architecture as described herein or can be implemented in hardware or a combination of both. Similarly, header register 12 and communications header register 35 can be software programs or can be implemented in hardware or a combination of both. Software means for linking 19 and secondary software means for linking 37 is a well-known standard that is typically a software data structure referred to as a linked list but any other compilation of information can work as well depending on the application.

Communication bus 51 can be any conventional interconnection data bus. More particularly, any bus that is compatible with a random accessible memory scheme can be used. Any communications medium whether it is a physically connected medium or not can be used as long as the cards can communicate with each other via, for example, random accessible memory addresses. Communications bus 51 can include any hardware interconnection bus that allows communication of data between circuit cards via addressable memory techniques, such as, for example, a Versa Eurocard Module (VME64), CompactPCI and PCI communications buses. The scope of the present invention is for use on a communications bus, which is not necessarily hard-wired among electrical circuitry, but is also intended to cover those communications buses which communicate data by any means (such as transmission by frequency means).

The functionality of each circuit card $41_n$ is application dependent and can vary depending on the overall system requirements. Without limitation, some examples of circuit card functions can include graphic processing cards, mathematical processing cards, data storage cards, input/output cards and general purpose processing cards. Typically, each circuit card is housed within a box 43 (also conventionally referred to as "card cages" or simply "cages"), each box 43 connectable to the communications bus 51. Thus, some circuit cards $41_n$ can be removable depending upon the application. Because of the nature of communications buses, each card $41_n$ is able to communicate (and thus, transfer data) with any other card $41_n$.

Circuit card $41_n$, at a basic level, can include processor(s), memory, and a bus on which they communicate. Generally, there are many components on the cards such as one or two other busses connecting different memories, or input/output devices, and hardware to control power distribution at different voltages and currents. Special purpose chips that perform various functions ranging from providing timers to special mathematical/logical functions to connecting two different busses. Many of the foregoing are commercially available circuit cards and the implementation of such will be apparent to those skilled in the art.

Figure 4:
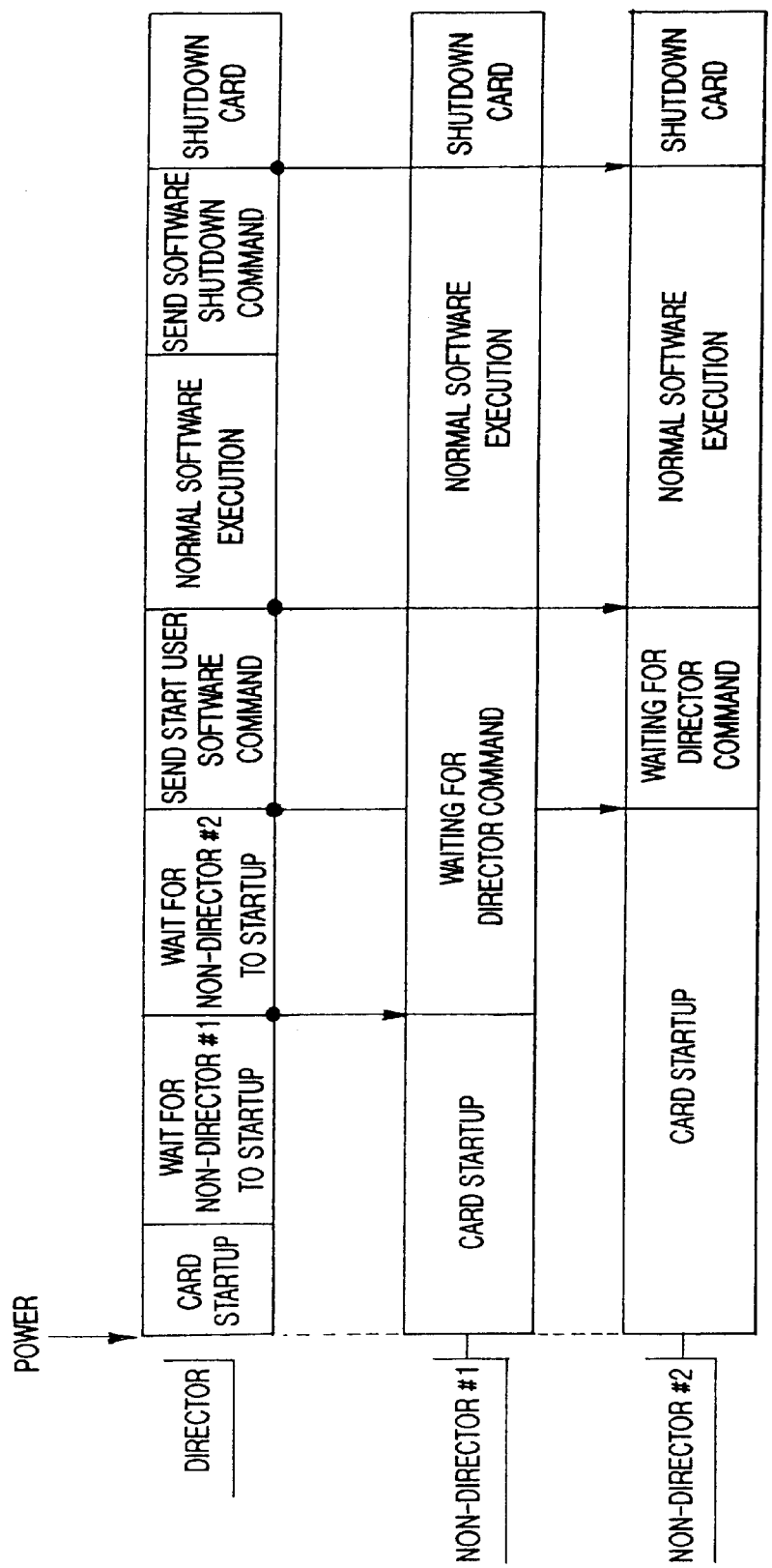
FIG. 4 is a graphical representation of the run-time operation of the present invention.

FIG. 4 illustrates the run-time sequence for the present invention to facilitate communications between a first processor 11 in communication with a computer and at least a secondary processor $31_n$ in communication with a circuit card $41_n$ having predefined electronic circuitry means and in electrical communication with the first processor 11 by a data communications bus 51. First, a software means for communicating data 33 and a predefined software routine must be loaded on each secondary processor $31_n$, the means for communicating data including a communications header register 35. Then, software means for directing 13 is loaded on and executed in the first processor 11, the means for directing 13 including a director header data register 12. Then, by communication between the means for directing 13 and the means for communicating data 33, the electronic circuitry means on each circuit card $41_n$ is initialized. During this initialization, each circuit card is queried by the means for directing 13 to determine whether the card is completely initialized and to determine whether each card $41_n$ encountered any errors.

Each means for communicating data 33 maintains a ready state to receive further communication from the means for directing 13. As necessary, the means for directing 13 is thereafter allowed to transfer data with each means for communicating data 33 by polling each communications header register 35. In this regard, the means for directing 13 is allowed to command each circuit card $41_n$ to commence execution of any predefined software routine. The means for directing 13 is allowed to electrically test and control the electronic circuitry means on one or more predefined circuit cards $41_n$. If needed, the means for directing 13, at a predetermined time, can prepare and control each circuit card $41_n$ to power down.

In one embodiment of the present invention, each card or module performs a minimal set of on-board built-in-tests at start-up to verify execution capabilities. Inter-module tests are then performed to test interfaces between modules including the VME back plane. The resulting fault status is reported in the common header which the primary software program queries. The primary software program is in control of synchronizing all modules during the various modes of the computer system operation. The primary software program is also responsible for maintaining a system status table indicating the health of the particular computer and fault logging. The secondary software program provides top level module control. The secondary software program contains several major synchronization points where it waits for commands from the primary software program. The secondary software programs return state status to the primary software program for control and synchronization.

Other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention 10 and are not intended to limit the scope of the invention. It is contemplated that the use of the present invention 10 can involve components having different characteristics as long as the principle, the presentation of a computer system and method for allowing communication to take place between primary (or director) software and at least one secondary (or non-director) software routine through a communications data bus, is followed.

The embodiments of an invention in which an exclusive property or right is claimed are defined as follows:

1. A computer software control and communication system for a computer, the computer in communication with a communications bus, the system comprising:
    at least a first means for processing data in communication with the computer and having a first means for storing data;
    at least a secondary means for processing data in communication with a circuit card and having a secondary means for storing data, the circuit card in communication with the computer by the communications bus;
    software means for directing, stored on the first means for storing data and executed on the first means for processing; and
    software means for communicating data on the circuit card to and from the means for directing, the means for communicating stored on each secondary means for storing data and executed on each secondary means for processing, wherein the software means for directing further comprises a director header register stored on the at least a first means for processing data, for storage of at least status information and fault information, and wherein the software means for communicating data further comprises a communications header register stored on each of the secondary means for processing data, for storage of at least a secondary status information and at least a secondary fault information, wherein the director header register and the communications header register both comprise at least a thirty two bit by four word data register.

2. The system of claim 1 wherein the director header register comprises a first thirty two bit by seven word data register, the first thirty two bit by seven word data register storing a first software means for linking.

3. The system of claim 2 wherein the communications header register comprises a secondary thirty two bit by seven word data register, each secondary thirty two bit by seven word data register storing a secondary software means for linking.

4. The system of claim 3 wherein the secondary software means for linking is a dynamic software pointer, pointable to any memory register.

5. The system of claim 4 wherein the software pointer contains a null value.

6. The system of claim 5 wherein the communications bus is selected from the group consisting of a Versa Module Eurocard (VME) communications bus, a CompactPCI communications bus and a PCI communications bus, and combinations thereof.

7. A data processing system for embedded systems having a data communications bus, comprising:
    a first computer processing means having a first data storage means within the embedded system;
    a plurality of secondary computer processing means in electrical communication with the first computer processing means by a communications bus, each secondary computer processing means having a secondary data storage means;
    software means, stored on the first data storage means and executed on the first computer processing means, for directing; and
    software means, stored on the secondary data storage means and executed on said each secondary computer processing means, for transferring data from said each secondary computer processing means to the first computer processing means, wherein the software means for directing further comprises a director header means for the storage of director software, and the software means for transferring data further comprises a communications header means for the storage of communications software, wherein the director header means and the communications header means both comprise at least a thirty two bit by four word data register.

8. The data processing system of claim, 7 wherein the director header means and the communications header means both comprise a thirty two bit by seven word data register.

9. The data processing system of claim 8 wherein the director header means further comprises a director means for linking and the communications headers means further comprises a communications means for linking.

10. The data processing system of claim 9 wherein the director means for linking and the communications means for linking are dynamic software pointers, pointable to any memory register.

11. The data processing system of claim 10 wherein the communications bus is selected from the group consisting of a Versa Module Eurocard (VME) communications bus, a CompactPCI communications bus and a PCI communications bus, and combinations thereof.

12. A method for using a computer to facilitate communications between a first processor communicating with a computer and at least a secondary processor in communication with one or more circuit cards having predefined electronic circuitry means and in electrical communication with the first processor by a data communications bus, comprising the steps of:
    pre-loading a software means for communicating data and a predefined software routine on each secondary processor, the means for communicating data including a communications header register;
    loading a software means for directing in the first processor, the means for directing including a director header data register;
    initializing, by communication between the means for directing and the means for communicating data, the electronic circuitry means on the one or more circuit cards in communication with the communications bus;
    for each means for communicating data, maintaining a ready state to receive further communication from the means for directing;
    allowing the means for directing to transfer data with said each means for communicating data by polling each communications header register; and
    allowing the means for directing to test and control the electronic circuitry means on the one or more circuit cards.

13. The method of claim 12 further including the step of having the means for directing, at a predetermined time, prepare and control the one or more circuit cards to power down.

14. The method of claim 13 wherein the communications header register and the director header data register both comprise at least a thirty two bit by four word data register for storage of at least status information and fault information.

15. The method of claim 14 wherein the communications header register and the director header data register both comprise a thirty two bit by seven word data register for storage of a software means for linking, the means for directing communicating with the means for linking to communicate additional data relating to the electronic circuitry means on any of the one or more circuit cards attached to the communications bus.

16. The method of claim 15 wherein the step of initializing the electronic circuitry means on the one or more circuit cards further includes the step of querying each circuit card to determine whether the card is completely initialized and to determine whether the card encountered any errors.

17. The method of claim 16 wherein the step of allowing the means for directing to transfer data with each means for communicating data further includes the step of having the means for directing commanding each circuit card to commence execution of the predefined software routine.

18. The method of claim 17 wherein the communications bus is selected from the group consisting of a Versa Module Eurocard (VME) communications bus, a CompactPCI communications bus and a PCI communications bus.

19. A method for software controlling and communicating within an embedded system, the embedded system having a primary processing means for controlling communicating with the embedded system and at least a controllable processing means connected to at least one circuit card, the controllable processing means having a software means for communicating data and a predefined software program loaded thereon, the controllable processing means including a communications header register, the at least one circuit card having predefined electronic means for processing data and in electrical communication with the primary processing means by a communications bus, comprising the steps of:

loading a software means for controlling in the primary processing means for controlling, the primary processing means for controlling including a controller header data register;

for each software means for communicating data, maintaining a ready state to receive further communication from the software means for controlling;

controlling, by the software means for controlling, the transfer of data with each software means for communicating data by polling each communications header register; and allowing the software means for controlling to test and control the electronic means for processing data on at least one circuit card.

20. The method of claim 19, further including the step of having the means for controlling prepare and control each electronic means for processing data to power down.

21. The method of claim 20 wherein the communications header register and the controller header data register both comprise at least a thirty two bit by four word data register for storage of at least status information and fault information.

22. The method of claim 21 wherein the communications header register and the controller header data register both comprise a thirty two bit by seven word data register for storage of at least one linked list, the software means for controlling communicating with each linked list to communicate additional data relating to the electronic means for processing data on any of the circuit cards communicating with the communications bus.

23. The method of claim 22 wherein the step of allowing the software means for controlling to test and control the electronic means for processing data further includes the step of having the means for controlling command each electronic means for processing data to commence execution of the predefined software program.

24. The method of claim 23 wherein the communications bus is selected from the group consisting of a Versa Module Eurocard (VME) communications bus, a CompactPCI communications bus and a PCI communications bus, and combinations thereof.

* * * * *